(12) United States Patent
Petz et al.

(10) Patent No.: US 9,205,583 B2
(45) Date of Patent: Dec. 8, 2015

(54) METHOD FOR MANUFACTURING A HOUSING ELEMENT HAVING A DECORATIVE COVERING AND A GRIP LAYER

(75) Inventors: Hubert Petz, Eindhoven (NL); Marinus Arnoldus Martinus Vugts, Eindhoven (NL); Michel Bleeker, Eindhoven (NL); Johannes Bernardus Valentinus Van Opzeeland, Eindhoven (NL); Geert Mulder, Eindhoven (NL); Erwin Bodewits, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1283 days.

(21) Appl. No.: 12/515,965

(22) PCT Filed: Nov. 28, 2007

(86) PCT No.: PCT/IB2007/054822
§ 371 (c)(1),
(2), (4) Date: May 22, 2009

(87) PCT Pub. No.: WO2008/065621
PCT Pub. Date: Jun. 5, 2008

(65) Prior Publication Data
US 2010/0055403 A1    Mar. 4, 2010

(30) Foreign Application Priority Data

Nov. 28, 2006  (EP) .................................. 06124940

(51) Int. Cl.
*B29C 45/16*  (2006.01)
*B29C 45/14*  (2006.01)

(52) U.S. Cl.
CPC ....... *B29C 45/1671* (2013.01); *B29C 45/14811* (2013.01); *B29C 45/14688* (2013.01); *B29C 45/1676* (2013.01); *B29K 2715/006* (2013.01); *B29K 2995/002* (2013.01); *Y10T 428/24479* (2015.01); *Y10T 428/24983* (2015.01); *Y10T 428/2804* (2015.01)

(58) Field of Classification Search
CPC ..................... B29C 45/1671; B29C 45/14811
See application file for complete search history.

(56) References Cited

U.S. PATENT DOCUMENTS

| 2,871,899 | A |   | 4/1958  | Coyle            |         |
|-----------|---|---|---------|------------------|---------|
| 5,376,314 | A | * | 12/1994 | Share et al.     | 264/400 |
| 5,525,179 | A | * | 6/1996  | Stickling        | 156/245 |
| 5,651,998 | A |   | 7/1997  | Bertschi et al.  |         |

(Continued)

FOREIGN PATENT DOCUMENTS

| DE | 4015125 A1 | 11/1991 |
|----|------------|---------|
| EP | 1273422 A1 | 1/2003  |

(Continued)

*Primary Examiner* — Edmund Lee

(57) ABSTRACT

A housing element of a product includes a foil having a decorated side, where this decorated side of the foil is covered by a grip layer for realizing a grip effect. The other side of the foil is covered by a supportive layer. The grip layer may have a rib structure. Each of the supportive layer and the grip layer is applied to the foil in an injection molding process. A processing temperature of the material of the grip layer is significantly lower than an activation temperature of printing ink of a decorative covering of the foil, so that washout of the printing ink is prevented. Further, material of an adhesive layer of the foil is configured to establish adhesion to the material of the grip layer at this relatively low temperature.

13 Claims, 3 Drawing Sheets

(56) References Cited

U.S. PATENT DOCUMENTS

| | | | |
|---|---|---|---|
| 6,504,928 B1 * | 1/2003 | Toyooka | 379/433.01 |
| 6,752,946 B2 * | 6/2004 | Toyooka | 264/154 |
| 6,790,396 B2 * | 9/2004 | Eiden et al. | 264/132 |
| 6,875,301 B2 * | 4/2005 | Kauppi et al. | 156/245 |
| 6,925,315 B2 * | 8/2005 | Langford | 455/575.1 |
| 6,977,809 B2 * | 12/2005 | Bovino | 361/679.55 |
| 7,419,272 B2 * | 9/2008 | Schenke et al. | 359/614 |
| 7,555,325 B2 * | 6/2009 | Goros | 455/575.8 |
| 7,906,054 B2 | 3/2011 | Hirschfelder | |
| 8,043,686 B2 | 10/2011 | Suzuki | |
| 2003/0028987 A1 | 2/2003 | Morawski et al. | |
| 2004/0183279 A1 | 9/2004 | DePue et al. | |
| 2004/0224786 A1 | 11/2004 | Reardon | |
| 2005/0203542 A1 * | 9/2005 | Weber et al. | 606/107 |
| 2005/0221909 A1 | 10/2005 | Nam | |
| 2006/0019088 A1 | 1/2006 | Wang et al. | |
| 2007/0065223 A1 * | 3/2007 | Singer et al. | 401/131 |
| 2007/0103859 A1 * | 5/2007 | Yu | 361/683 |
| 2007/0170621 A1 * | 7/2007 | Peng et al. | 264/328.1 |

FOREIGN PATENT DOCUMENTS

| | | |
|---|---|---|
| EP | 1612024 A1 | 1/2006 |
| EP | 1710069 A2 | 10/2006 |
| JP | 01114407 A | 5/1989 |
| JP | 07276428 A | 10/1995 |
| JP | 2004322540 A | 11/2004 |
| WO | 2004011223 A1 | 2/2004 |
| WO | 2005070647 A1 | 8/2005 |

* cited by examiner

METHOD FOR MANUFACTURING A HOUSING ELEMENT HAVING A DECORATIVE COVERING AND A GRIP LAYER

FIELD OF THE INVENTION

The present invention relates to a method for manufacturing an element which is intended to be applied as a part of a product such as a product for domestic appliance or a personal care product, in particular an element having a soft-touch grip section for realizing a grip effect, so that a user of the product having the element may have a firmer grip on the product than in case the grip section would be absent.

The present invention also relates to a method for manufacturing a product such as a product for domestic appliance or a personal care product, comprising a step of manufacturing a housing element of the product, which involves carrying out the above-described method for manufacturing an element.

BACKGROUND OF THE INVENTION

Hand-held appliances such as mobile phones, audio equipment and personal care products are getting smaller due to miniaturization of components. At the same time, there is a need for a nicely decorated appearance of these appliances. In case it is desired to provide an appliance with a soft-touch grip section for realizing a grip effect, there is only little space for a decorative section, as a result of which the appliance is less appealing to consumers.

A well-known example of an appliance having a soft-touch grip section is an electric shaver which is intended to be used in wet environments such as a shower. In many cases, in order to prevent a user of the shaver from losing grip on the shaver, which may even lead to a situation in which the shaver falls on the ground and gets damaged, a section of the shaver is covered by a rubber-like material. The presence of this material enables the user to have a firmer grip on the shaver, even when the user's hands are wet and/or the shaver is wet.

In some cases, the soft-touch grip section of an appliance is locally decorated, for instance by means of a process known as pad printing. However, it is not possible to cover the whole surface of the soft-touch grip section, especially when this section and the surface have a curved shape.

A well-known technique for decorating an element is known as in-mold labeling or insert molding. This is a labeling technique which has many applications, and which, among other things, is suitable to be used for labeling injection molded products. For the purpose of carrying out a labeling process, an in-mold label is provided, which has a heat activated adhesive applied on it. The labeling process comprises the steps of placing the in-mold label in a mold; closing the mold; and injecting molten plastic material into the mold. In the process, the heat from the plastic activates the adhesive, causing the label to adhere to the plastic product. According to the state of the art, when the in-mold labeling technique is used for decorating an element which also needs to be provided with a soft-touch grip section, this section is provided outside of the decorated area of the element.

SUMMARY OF THE INVENTION

It is an objective of the present invention to provide a method for manufacturing an element having a soft-touch grip section for realizing a grip effect, wherein it is possible to create an overall decorated look of the element, despite of the presence of the grip section. This objective is achieved by a method for manufacturing an element which is intended to be applied as a part of a product such as a product for domestic appliance or a personal care product, comprising the following steps:

providing a foil having a decorated side;
applying a supportive layer of a first material to another side of the foil than the decorated side; and
applying a grip layer of a second material to the decorated side of the foil.

According to the present invention, a foil having a decorated side is used for realizing a decorated appearance of the element, wherein a grip layer is applied to the decorated side of the foil. In this way, the soft-touch grip section of the element is formed. Within the scope of the present invention, the material of the grip section may be translucent, so that the decoration may be visible through the grip section. Besides the grip layer, which is applied to the decorated side of the foil, another layer is provided, namely a supportive layer, which is applied to another side of the foil. On the basis of this supportive layer, the element obtains a required stiffness and robustness. Preferably, the material for forming the supportive layer is processed at a temperature above 295° C., for instance at a temperature of 300° C., so that sufficient adhesion of the supportive layer to the foil may be realized.

In many feasible applications of the present invention, it is preferred if a material which, in a solidified state, is softer than the first material for forming the supportive layer is used as the second material for forming the grip layer. The relatively soft material is suitable for realizing a desired grip effect, whereas the relatively hard material is suitable for realizing a required stiffness and robustness of the element. Nevertheless, the method according to the present invention may also be applied for the purpose of manufacturing a flexible element having a grip layer, in which element the supportive layer may comprise an even softer material than the grip layer.

Advantageously, a material having a hardness of lower than 70 Shore A, in a solidified state, is used as the second material for forming the grip layer. In that way, it is ensured that a sufficient grip effect is realized. Furthermore, forming the grip layer with interruptions according to a predetermined pattern contributes to the grip effect. For example, the pattern of interruptions may be chosen such that a rib structure is obtained in the grip layer.

The method according to the present invention may be used for the purpose of manufacturing elements having any desired shape, including a complex three-dimensional shape. In a practical way of carrying out the method, the foil is given a predetermined shape, prior to the steps of applying the supportive layer and the grip layer.

Preferably, the step of applying the supportive layer to the foil is carried out by placing the foil in a mold for injection molding, introducing the first material into the mold, in a liquefied state, and allowing the liquid material to solidify, and the step of applying the grip layer to the foil having the supportive layer is carried out by placing the foil having the supportive layer in a mold for injection molding, introducing the second material into the mold, in a liquefied state, and allowing the liquid material to solidify.

In general, a process in which an element is manufactured on the basis of two injection molding steps, wherein an intermediate product which is obtained as a result of a first injection molding step is placed in another mold which is furthermore filled with another material during a second injection molding step is known as two-component injection molding process. According to a well-known option, a mold having two mold cavities and one rotatably arranged mold part is applied for the purpose of carrying out a two-component injection molding process in an automated fashion.

In the preferred situation in which the method according to the present invention comprises two injection molding steps, it may be recognized that the method is based on a combination of the in-mold labeling process and the two-component injection molding process, wherein the foil is regarded as a kind of in-mold label. In order to get decorated elements with an appropriate grip feeling at high visual and functional requirements, several aspects need to be regarded, which depend on each other. Among these aspects are adhesion of the first material and the second material to the foil, and washout of printing ink on the foil during the injection molding processes on both sides of the foil.

When the method according to the present invention is applied for the purpose of manufacturing an element, it is very well possible to obtain both a good adhesion of the layers to the foil and to avoid deterioration of the decoration, even in case of an element having special features which are known such as to have a decreasing effect on the adhesion and/or an increasing effect on the washout of printing ink. In this respect, it is noted that in general, it is more difficult to guarantee a sufficient extent of adhesion and an unaffected decoration in situations in which a metallic surface effect is wanted, an extremely curved shape is wanted, a translucent material is used for forming the grip layer, a material having a hardness of lower than 70 Shore A is used for forming the grip layer, a high chemical resistance is wanted and/or it is desired to make the grip layer with thin rubber strips having a small wall thickness.

The present invention also relates to a method for manufacturing a foil having a decorated side, which foil is suitable to be used in a process of manufacturing an element which is intended to be applied as a part of a product such as a product for domestic appliance or a personal care product, for instance a process as described in the foregoing. According to the present invention, the method for manufacturing a foil having a decorated side comprises the following steps:
  providing a base foil;
  applying a decorative covering comprising at least one color layer of coloring material to a side of the base foil which is intended to be the decorated side; and
  applying an adhesive layer of a binder material having an activation temperature which is significantly lower than an activation temperature of the coloring material of the at least one color layer of the decorative covering on top of the decorative covering.

As a result of carrying out these steps, a foil comprising a base foil, a decorative covering arranged on one side of the base foil, and an adhesive layer arranged on top of the decorative covering is obtained. When the foil is applied in a process of manufacturing an element having a decorative look and a soft-touch grip section, a supportive layer is applied to a free side of the base foil, i.e. another side of the base foil than the side where the decorative covering and the adhesive layer are located. In the process, washout of printing ink in the decorative covering does not occur, as the base foil constitutes a barrier between the material of the supportive layer and the decorative covering.

The decorative covering of the foil comprises one or more color layers of coloring material, wherein an activation temperature of this material is relatively high, for example above 260° C., whereas the activation temperature of the material of the adhesive layer is relatively low, for example below 200° C. When the foil is applied in a process of manufacturing an element having a decorative look and a soft-touch grip section, a grip layer of relatively soft material is applied on top of the adhesive layer. Due to the different activation temperatures of the materials of the decorative covering and the adhesive layer of the foil, it is very well possible to process the material of the grip layer at a temperature for guaranteeing a good adhesion to the adhesive layer of the foil on the one hand, and for preventing washout of printing ink of the decorative covering on the other hand. For example, the processing temperature may be close to 200° C. For sake of completeness, it is noted that a good adhesion of the grip layer to the adhesive layer of the foil is very important, as situations in which the grip layer may easily be peeled off of the adhesive layer need to be avoided, particularly in case the element comprising the foil and the grip layer is applied in a consumer product.

The at least one color layer of the decorative covering of the foil may be formed with at least one interruption. In this way, it is possible to create one or more windows in the color layer. A special optical effect may be obtained when the decorative covering comprises several color layers, and when one of the color layers, which is covered by at least one other color layer, is provided with at least one interruption. When the foil is part of an element having a grip layer comprising translucent material, wherein the element is a housing element that is positioned at an outer side of a product having an internal light source, the at least one window in the foil allows the light to pass, wherein the light is scattered by the top color layer(s) and the grip layer.

Within the scope of the present invention, many ways of obtaining interesting optical effects are feasible. For example, the decorative covering may comprise a semitransparent vacuum metallized layer for realizing a metallic surface effect.

The present invention further relates to an element for a product such as a product for domestic appliance or a personal care product, comprising:
  a foil having a decorated side;
  a supportive layer of a first material, covering another side of the foil than the decorated side, while being fixedly connected to this side of the foil; and
  a grip layer of a second material, covering the decorated side of the foil, while being fixedly connected to this side of the foil.

The element may be manufactured in the way as described in the foregoing. Furthermore, the foil which is part of the element may be a foil as described in the foregoing. However, the foil may also be of another type, and may for example be a foil which only comprises a base foil and a decorative covering, and which does not comprise an adhesive layer.

Preferably, the element is a housing element that is intended to be positioned at an outer side of a product. In that case, on the basis of the presence of the element, the product may have any decoration as desired, while comprising a grip layer for allowing a user of the product to firmly take hold of the product, even when having wet hands.

The present invention does not only relate to the element as described in the foregoing, but also to a product chosen from a group of products comprising products for domestic appliance and personal care products, comprising this element.

The above-described and other aspects of the present invention will be apparent from and elucidated with reference to the following description of an embodiment of the element according to the present invention.

BRIEF DESCRIPTION OF THE DRAWINGS

The present invention will now be explained in greater detail with reference to the figures, in which equal or similar parts are indicated by the same reference signs, and in which.

DETAILED DESCRIPTION OF AN EMBODIMENT

Figure 1:
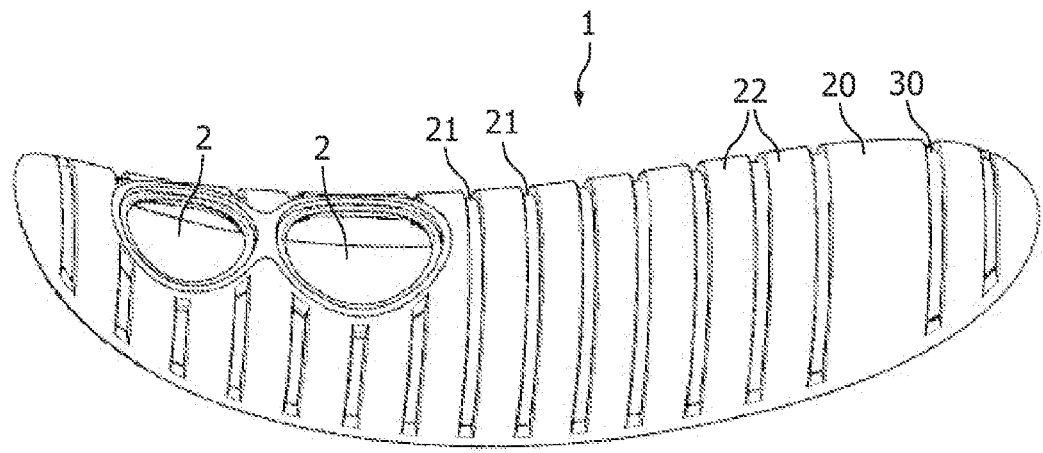
FIGS. 1 and 2 diagrammatically show perspective views of an element according to a preferred embodiment of the present invention.
Figure 2:
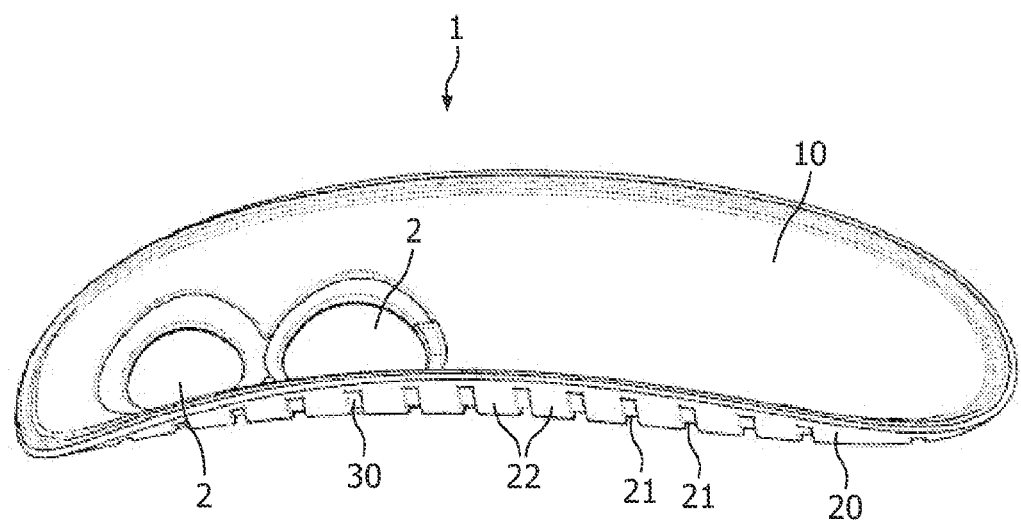

FIGS. 1 and 2 show a housing element 1 which is intended to be used in a shaver. In particular, the housing element 1 is intended to be part of a grip portion of a shaver, i.e. a portion of the shaver which is taken hold of by a user when the user wants to perform a shaving action by means of the shaver. In FIG. 1, the housing element 1 is shown with an outer side up, whereas in FIG. 2, the housing element 1 is shown with an inner side up.

In the shown example, the housing element 1 has two holes 2. The number of holes 2 is not essential within the scope of the present invention, and the holes 2 may be omitted altogether. The holes 2 may serve for accommodating a button or the like for operating the shaver, or for providing an unhindered view to a display, for example.

The housing element 1 has a layered structure, wherein the layers are firmly interconnected. In particular, the housing element 1 comprises a supportive layer 10 of a relatively hard material, a grip layer 20 of a relatively soft material for providing a grip effect, and a foil 30 which is arranged between the supportive layer 10 and the grip layer 20.

The supportive layer 10 serves for guaranteeing a certain stiffness of the housing element 1. In the shown example, the supportive layer 10 is translucent, so that the housing element 1 is suitable to be applied as a part of a shaver having an internal light source, wherein it is desired to let light shine through at least some portions of the housing element 1, from the inner side of the housing element 1 to the outer side. The supportive layer 10 may comprise any suitable material, for example polycarbonate (PC), methyl methacrylate acrylonitrile butadiene styrene (MABS), polymethyl methacrylate (PMMA), or polyethylene terephthalate (PET).

The grip layer 20 serves for realizing a grip effect, in other words, the grip layer 20 enables a user to firmly take hold of the housing element 1. Two factors contributing to the grip effect are the fact that the grip layer 20 comprises a relatively soft, deformable material and the fact that the grip layer 20 has a rib structure. In particular, the rib structure is realized on the basis of the fact that the grip layer 20 is provided with a number of elongated interruptions 21, wherein portions of the grip layer 20 extending between two interruptions 21 may be regarded as ribs 22. At the positions of the interruptions 21, the foil 30 is freely accessible. In the shown example, none of the interruptions 21 extends all the way to a circumference of the grip layer 20, so that none of the ribs 22 has a free end, but is connected to a circumferential rim of material of the grip layer 20 instead. This configuration of the interruptions 21 and the ribs 22 contributes to a secure positioning of the ribs 22 on the foil 30, and enables the ribs 22 to withstand shearing forces which may be exerted by a user.

Preferably, in order to realize an outstanding grip effect, a hardness of the material of the grip layer 20 is lower than 70 Shore A. The grip layer 20 may be translucent, so that the underlying foil 30 does not only show through the interruptions 21, but may also show at the positions where material of the grip layer 20 is present. An example of a material which may be applied in the grip layer 20 is a synthetic rubber-like material such as a thermoplastic elastomer (TPE), for example styrene ethylene butylene styrene (SEBS).

Figure 3:
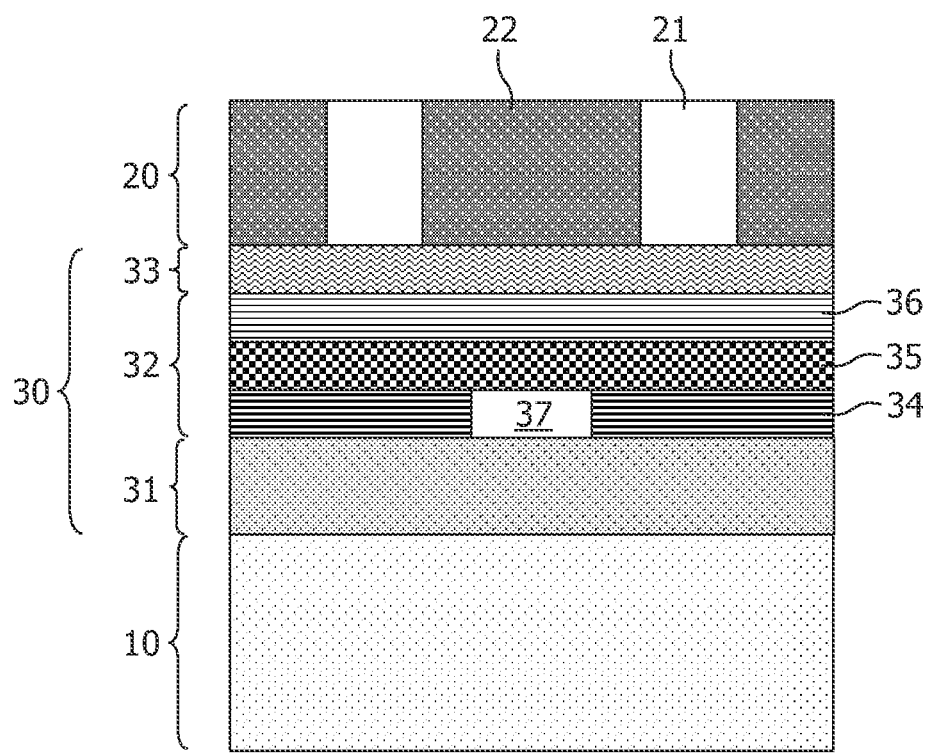
FIG. 3 diagrammatically shows a side view of a portion of a cross-section through the element as shown in FIGS. 1 and 2.

The foil 30 serves for providing the housing element 1 with a nicely decorated appearance. The structure of the foil 30 will now be explained on the basis of FIG. 3.

The foil 30 comprises a base foil 31, a decorative covering 32, and an adhesive layer 33, wherein the decorative covering 32 is sandwiched between the base foil 31 and the adhesive layer 33, and wherein the adhesive layer 33 is translucent. The base foil 31 has a function in separating the supportive layer 10 from the decorative covering 32, in order to prevent deterioration of the decorative covering 32 during a manufacturing process of the housing element 1, and may comprise a material like polycarbonate (PC), polyethylene terephthalate (PET) or polypropylene (PP). The adhesive layer 33 has a function in interconnecting the foil 30 and the grip layer 20. Advantageously, the adhesive layer 33 comprises a binder material having an activation temperature below 200° C., so that, during the manufacturing process of the housing element 1, enhanced adhesion of the grip layer 20 to the foil 30 may be obtained, without a risk of deterioration of the decorative covering 32, as will be explained later.

In the shown example, the decorative covering 32 comprises three color layers 34, 35, 36 of coloring material. It is noted that the number of color layers 34, 35, 36 of the decorative covering 32 is not essential, and that the number of color layers 34, 35, 36 may as well be less than three, or more than three, depending on desires regarding the appearance of the side of the foil 30 where the decorative covering 32 is located, i.e. the decorated side of the foil 30. Moreover, the at least one color layer 34, 35, 36 of the decorative covering 32 may have any suitable features, and the following description of details of the color layers 34, 35, 36 should therefore only be understood as an example of the numerous possibilities existing within the scope of the present invention.

An inner color layer 34, i.e. a color layer 34 covering the base foil 31, comprises black printing ink in order to realize a dark color base. The inner color layer 34 comprises an interruption 37, which is intended to serve as a window for letting through light from the inner side of the housing element 1 to the outer side of the housing element 1.

An intermediate color layer 35, i.e. a color layer 35 covering the inner color layer 34, is a semitransparent vacuum metallized layer, and serves for achieving a mirror effect.

An outer color layer 36, i.e. a color layer 36 covering the intermediate color layer 35, comprises colored printing ink. The outer color layer 36 may comprise more than one sublayer of printing ink, wherein printing inks of different colors may be used, so that any desired decoration may be realized.

Preferably, all of the printing ink which is used in the decorative covering 32 has an activation temperature above 260° C. In this way, washout of the printing ink during the manufacturing process of the housing element 1 is prevented. Due to the fact that the binder material of the adhesive layer 33 has an activation temperature below 200° C., there is no need for a processing temperature of the material of the grip layer 20 to get any higher, so that the temperature of the printing ink in the decorative covering 32 does not get near its activation temperature.

In the following, a description of a preferred way of carrying out the manufacturing process of the housing element 1 is given.

In the first place, the foil 30 is manufactured by providing the base foil 31; applying the decorative covering 32 to the base foil 31 by successively forming the various color layers 34, 35, 36 of the decorative covering 32; and applying the adhesive layer 33 to the decorative covering 32. Furthermore, if appropriate, the foil 30 is shaped and cut.

In the second place, on the basis of the foil 30, the housing element 1 is formed by performing the following steps:
- positioning the foil 30 in a mold cavity of a mold (not shown), wherein a space is present at the side of the foil 30 where the base foil 31 is located;
- closing the mold;
- introducing material for forming the supportive layer 10 of the housing element 1 in the mold, in a liquefied state, wherein the material is processed at a relatively high temperature of 300° C., for example, in order to ensure filling of the space in the mold, and to achieve sufficient adhesion of the material to the base foil 31;
- allowing the material of the supportive layer 10 to solidify;
- opening the mold and taking an intermediate product comprising the foil 30 and the supportive layer 10 out of the mold cavity;
- positioning the intermediate product in another mold cavity of the mold, or providing another mold (not shown) and positioning the intermediate product in a mold cavity of this mold, wherein a space is present at the side of the foil 30 where the adhesive layer 33 is located;
- closing the mold;
- introducing material for forming the grip layer 20 of the housing element 1 in the mold, in a liquefied state, wherein the material is processed at a relatively low temperature of 195° C., for example, in order to prevent washout of the printing ink of the decorative layer 32 of the foil 30;
- allowing the material of the grip layer 20 to solidify;
- opening the mold and taking a final product comprising the foil 30, the supportive layer 10 and the grip layer 20 out of the mold cavity.

By applying the method as described in the foregoing, a unique combination of decoration and grip effect may be realized by providing a product having a decorative part and a grip part which are joined such as to form an integral whole. On the basis of the decorative covering 32 of the foil 30, it is possible to create any decorative appearance as desired. When the grip layer 20 is translucent, all of the decoration may show, wherein an additional visual effect is obtained as a result of the structure of the grip layer 20. It is noted that the grip layer 20 may also comprise an uninterrupted layer of material, but as a rib structure constitutes a significant contribution to the grip effect, it may be preferred to have such a structure.

The application of injection molding techniques for the purpose of applying the supportive layer 10 and the grip layer 20 to the foil 30 is preferred, as this allows for automated mass production. It is possible to use two molds and to transfer the intermediate product comprising the foil 30 and the supportive layer 10 from a first mold to a second mold, but it is also possible to use one mold having two mold cavities and a rotatably arranged mold part, as is known from common two-component injection molding processes. The manufacturing process of the housing element 1 is quite similar to a two-component injection molding process, with the exception that the foil 30 is provided first and is positioned in the mold before the material for forming the supportive layer 10 is injected, after which the material for forming the grip layer 20 is injected onto the foil 30.

It is noted that the supportive layer 10 may be provided with any suitable projection, hook-shaped member, etc. for attaching the housing element 1 to one or more other parts of the shaver during an assembly process of the shaver.

It is not at all necessary that the process of manufacturing the foil 30 is immediately followed by the process of applying the supportive layer 10 and the grip layer 20 to the foil 30. In practice, it may even be preferred to perform both processes independently. An advantage is that a great flexibility in creating different decorative looks of the housing element 1 is obtained, wherein there is no need to adjust expensive equipment. All that is needed to create a new look is providing different printing inks and different materials of the decorative covering 32 of the foil 30 during the manufacturing process of the foil 30.

In comparison to adhesion of the material of the grip layer 20 to a material such as polycarbonate, the adhesion of the material of the grip layer 20 to the adhesive layer 33 of the foil 30 is much better. The adhesion force may be so high that a force which is needed to peel off the grip layer 20 of the foil 30 while being exerted under an angle of 45° with respect to the surface of the grip layer 20 is higher than 70 N, so that it is practically impossible to remove the grip layer 20 from the foil 30 by hand.

Figure 4:
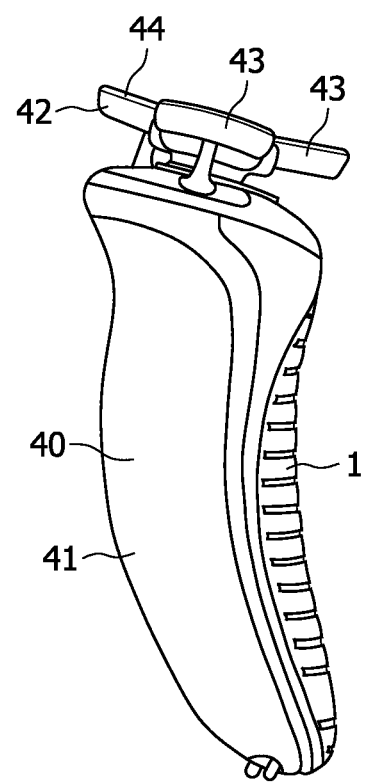
FIG. 4 diagrammatically shows a side view of a shaver comprising the element as shown in FIGS. 1 and 2.

FIG. 4 shows an electric shaver 40 having a grip portion 41 which is intended to be taken hold of by a user of the shaver 40 for the purpose of performing a shaving action. The grip portion 41 comprises the above-described housing element 1 according to the present invention. Hence, an outstanding grip effect is realized, and there is practically no risk of the shaver 40 slipping from the user's hand, even when the shaver 40 is used in a wet environment.

For sake of completeness, it is noted that the shaver 40 comprises a shaving portion 42 having a number of shaving heads 43 which are intended to contact portions of skin to be shaved. Inside each shaving head 43, a movably arranged cutter member (not shown) adapted to cutting through hair is present, which is covered by a cap 44 having holes for letting through hairs to be shaved off to an interior space of the shaving head 43 and thereby allowing these hairs to reach an operational area of the cutter member. When the user takes hold of the grip portion 41 and moves the shaving portion 42 along a portion of skin, while the cutter member is moved, a continuous process of catching hairs in the cap 44 of the shaving heads 43 and cutting off these hairs by the cutter member, i.e. a shaving process, is performed.

The fact that the application of the housing element 1 according to the present invention is illustrated in the context of the shaver 40 should not be understood such as to mean that the application of the housing element 1 is limited to this context, as the housing element 1 according to the present invention is suitable to be applied in a wide range of products, including products for domestic appliance and personal care products.

It will be clear to a person skilled in the art that the scope of the present invention is not limited to the examples discussed in the foregoing, but that several amendments and modifications thereof are possible without deviating from the scope of the present invention as defined in the attached claims. While the present invention has been illustrated and described in detail in the figures and the description, such an illustration and description are to be considered illustrative or exemplary only, and not restrictive. The present invention is not limited to the disclosed embodiment.

The present invention may be applied for the purpose of manufacturing elements of any desired shape, including a complex three-dimensional shape, wherein the elements may be suitable for use in any type of product in which a decorative look is appreciated. Besides the above-described example of a shaver 40, such a product may be any hand-held appliance such as a hair trimmer, a hair dryer, a (mobile) phone, etc., or a domestic appliance such as a coffee maker. The present invention is also very well applicable in the field of wearable electronics, audio and video.

An element which is obtained by applying the present invention may be light-weight, while having a relatively small thickness. For example, a thickness of the supportive layer 10 does not need to be larger than 1 mm, and the grip layer 20 may even be thinner, wherein its thickness may be 0.65 mm, for example.

Variations to the disclosed embodiment can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the present invention.

In the foregoing, a housing element 1 of a product such as a shaver 40 has been described. The housing element 1 comprises a foil 30 having a decorated side, wherein this side of the foil 30 is covered by a grip layer 20 for realizing a grip effect, and wherein another side of the foil 30 is covered by a supportive layer 10 for realizing a desired stiffness of the housing element 1. In particular, the foil 30 comprises a base foil 31, a decorative covering 32 and an adhesive layer 33, wherein the decorative covering 32 comprises at least one color layer 34, 35, 36 of coloring material. Preferably, the grip layer 20 has a rib structure, and comprises a material which is softer than the material of the supportive layer 10.

In a preferred way of manufacturing the housing element 1, each of the supportive layer 10 and the grip layer 20 is applied to the foil 30 in an injection molding process. A processing temperature of the material of the grip layer 20 is significantly lower than an activation temperature of printing ink of the decorative covering 32 of the foil 30, so that washout of the printing ink is prevented, whereas material of the adhesive layer 33 of the foil 30 is adapted to establish adhesion to the material of the grip layer 20 at this relatively low temperature.

The grip layer 20 may comprise a translucent material. In any case, when the present invention is put to practice, it is possible to obtain an element 1 having both a highly decorative look and good grip properties.

The invention claimed is:

1. A method for manufacturing an element which is intended to be applied as a part of a product for a domestic appliance, the method comprising the following acts of:
providing a foil having a decorated side;
applying a supportive layer of a first material to another side of the foil than the decorated side;
applying a grip layer of a second material to the decorated side of the foil; and
providing elongated interruptions in the grip layer, the elongated interruptions providing access to the foil;
wherein the foil comprises a base foil and a decorative covering, and wherein the providing act includes sub-acts of
providing the base foil;
applying the decorative covering comprising at least two color layers of coloring material to a decorated side of the base foil, wherein the two color layers include an inner color layer contacting the base foil and an outer color layer formed over the inner color layer; and
forming a window in the inner color layer configured to let light pass from the supportive layer to the outer color layer for scattering by the outer color layer and the grip layer.

2. The method according to claim 1, wherein a material which, in a solidified state, is softer than the first material for forming the supportive layer is used as the second material for forming the grip layer.

3. The method according to claim 1, wherein a material which, in a solidified state, has a hardness of lower than 70 Shore A is used as the second material for forming the grip layer.

4. The method according to claim 1, wherein a translucent material is used as the second material for forming the grip layer.

5. The method according to claim 1, wherein, prior to the acts of applying the supportive layer and the grip layer, the foil is given a predetermined shape.

6. The method according to claim 1, wherein the act of applying the supportive layer to the foil is carried out by placing the foil in a mold for injection molding, introducing the first material into the mold, in a liquefied state, and allowing the liquid material to solidify.

7. The method according to claim 1, wherein the act of applying the grip layer to the foil having the supportive layer is carried out by placing the foil having the supportive layer in a mold for injection molding, introducing the second material into the mold, in a liquefied state, and allowing the liquid material to solidify.

8. The method of claim 1, wherein the act of providing the foil comprises the act of:
applying an adhesive layer on top of the decorative covering, wherein the adhesive layer comprises a binder material having an activation temperature which is lower than an activation temperature of the coloring material of one color layer of the at least two color layers.

9. The method of claim 8, wherein the activation temperature of the coloring material is above 260° C., and wherein the activation temperature of the binder material is below 200° C.

10. The method of claim 8, wherein the first color layer is black.

11. The method according to claim 1, wherein the first material of the supportive layer is softer than the second material of the grip layer.

12. The method of claim 1, wherein the act of providing the foil further comprises the act of applying an adhesive layer on top of the outer color layer, wherein the adhesive layer comprises a binder material having an activation temperature which is lower than an activation temperature of the coloring material of the at least two color layers of the decorative covering.

13. The method of claim 1, wherein the grip layer includes ribs located between the elongated interruptions, and wherein the forming act forms the window below one of the ribs.

* * * * *